(12) United States Patent
Yang et al.

(10) Patent No.: US 11,770,649 B2
(45) Date of Patent: *Sep. 26, 2023

(54) SYSTEMS AND METHODS FOR AUTOMATIC SPEECH RECOGNITION

(71) Applicant: Ademco Inc., Golden Valley, MN (US)

(72) Inventors: Xiukuan Yang, Shanghai (CN); Chao Xiao, Shanghai (CN); Tao Chai, Shanghai (CN)

(73) Assignee: ADEMCO, INC., Golden Valley, MN (US)

( * ) Notice: Subject to any disclaimer, the term of this patent is extended or adjusted under 35 U.S.C. 154(b) by 75 days.

This patent is subject to a terminal disclaimer.

(21) Appl. No.: 17/182,381

(22) Filed: Feb. 23, 2021

(65) Prior Publication Data

US 2021/0185434 A1   Jun. 17, 2021

Related U.S. Application Data

(63) Continuation of application No. 16/694,078, filed on Nov. 25, 2019, now Pat. No. 10,966,018, which is a
(Continued)

(51) Int. Cl.
*H04R 1/40* (2006.01)
*H04R 1/08* (2006.01)
(Continued)

(52) U.S. Cl.
CPC .............. *H04R 1/406* (2013.01); *G10L 15/22* (2013.01); *G10L 15/28* (2013.01); *H04R 1/08* (2013.01);
(Continued)

(58) Field of Classification Search
CPC . H04R 1/406; H04R 1/40; H04R 1/08; H04R 3/005; H04R 3/00; H04R 29/005;
(Continued)

(56) References Cited

U.S. PATENT DOCUMENTS

| 4,223,831 A | 9/1980 | Szarka |
| 4,253,153 A | 2/1981 | Bitterli et al. |

(Continued)

FOREIGN PATENT DOCUMENTS

| CN | 201225714 Y | 4/2009 |
| CN | 101947788 A | 1/2011 |

(Continued)

OTHER PUBLICATIONS

European Search Report for European Patent Application 21168434.5, dated Sep. 2, 2021, 12 pgs.

(Continued)

*Primary Examiner* — Leshui Zhang
(74) *Attorney, Agent, or Firm* — Fredrikson & Byron, P.A.

(57) ABSTRACT

Systems and methods for speech recognition are provided. Some methods can include detecting a relative location of a user within one of a plurality of voice pickup areas of a multi-directional microphone array and the multi-directional microphone array activating a setting of the multi-directional microphone array based on the relative location of the user within the one of the plurality of voice pickup areas.

18 Claims, 3 Drawing Sheets

Related U.S. Application Data continuation of application No. 15/833,045, filed on Dec. 6, 2017, now Pat. No. 10,524,046.

(51) Int. Cl.

| | | |
|---|---|---|
| *G10L 15/22* | (2006.01) | |
| *H04R 3/00* | (2006.01) | |
| *G10L 15/28* | (2013.01) | |
| *H04R 29/00* | (2006.01) | |
| *G10L 21/0216* | (2013.01) | |

(52) U.S. Cl.
CPC .......... H04R 3/005 (2013.01); H04R 29/005 (2013.01); *G10L 2021/02166* (2013.01); *H04R 2201/401* (2013.01)

(58) Field of Classification Search
CPC .............. H04R 29/00; H04R 2201/401; H04R 25/407; H04R 3/04; H04R 3/10; H04R 1/1041; H04R 1/14; H04R 1/20; H04R 1/222; H04R 1/265; H04R 2201/40; H04R 2203/00; H04R 2203/12; H04R 29/004; H04R 29/006; H04R 25/40; H04R 25/402; H04R 25/405; G10L 21/00; G10L 21/0208; G10L 2021/02166; G10L 2021/0216; G10L 15/22; G10L 15/28; G10L 15/02; G10L 15/223; G10L 15/24; G10L 11/00; G09C 1/00
USPC ......... 381/92, 26, 86, 91, 95, 111, 112, 113, 381/114, 115, 122, 123, 355, 356, 358; 700/94; 379/69, 70, 79, 80, 902; 704/273, 275, 274, 246, 270, 231, 260; 455/570, 569.1, 114.2, 220, 221, 222, 223
See application file for complete search history.

(56) References Cited

U.S. PATENT DOCUMENTS

| | | |
|---|---|---|
| 4,340,797 A | 7/1982 | Takano et al. |
| 4,353,502 A | 10/1982 | Myers |
| 4,381,549 A | 4/1983 | Stamp, Jr. et al. |
| 4,598,397 A | 7/1986 | Nelson et al. |
| 4,790,143 A | 12/1988 | Hanson |
| 5,065,813 A | 11/1991 | Berkeley et al. |
| 5,086,385 A | 2/1992 | Launey et al. |
| 5,123,252 A | 6/1992 | Hanson |
| 5,161,606 A | 11/1992 | Berkeley et al. |
| 5,284,024 A | 2/1994 | Hanson et al. |
| 5,345,226 A | 9/1994 | Rice et al. |
| 5,395,042 A | 3/1995 | Riley et al. |
| 5,422,822 A | 6/1995 | Toyota et al. |
| 5,422,824 A | 6/1995 | Biehler et al. |
| 5,481,714 A | 1/1996 | Pipkin et al. |
| 5,553,064 A | 9/1996 | Paff et al. |
| 5,596,507 A | 1/1997 | Jones et al. |
| 5,682,329 A | 10/1997 | Seem et al. |
| 5,690,277 A | 11/1997 | Flood |
| 5,761,606 A | 6/1998 | Wolzien |
| 5,794,205 A | 8/1998 | Walters et al. |
| 5,818,438 A | 10/1998 | Howe et al. |
| 5,892,508 A | 4/1999 | Howe et al. |
| 5,903,816 A | 5/1999 | Broadwin et al. |
| 5,929,850 A | 7/1999 | Broadwin et al. |
| 5,940,118 A * | 8/1999 | Van Schyndel ........ H04R 3/005 348/14.05 |
| 5,961,603 A | 10/1999 | Kunkel et al. |
| 5,982,445 A | 11/1999 | Eyer et al. |
| 5,995,092 A | 11/1999 | Yuen et al. |
| 6,002,394 A | 12/1999 | Schein et al. |
| 6,005,561 A | 12/1999 | Hawkins et al. |
| 6,006,256 A | 12/1999 | Zdepski et al. |
| 6,009,392 A | 12/1999 | Kanevsky et al. |
| 6,083,270 A | 7/2000 | Scott |
| 6,172,677 B1 | 1/2001 | Stautner et al. |
| 6,385,510 B1 | 5/2002 | Hoog et al. |
| 6,413,079 B1 | 7/2002 | Lyons et al. |
| 6,477,493 B1 | 11/2002 | Brooks et al. |
| 6,477,508 B1 | 11/2002 | Lazar et al. |
| 6,526,335 B1 | 2/2003 | Treyz et al. |
| 6,584,439 B1 | 6/2003 | Geilhufe et al. |
| 6,584,613 B1 | 6/2003 | Dunn et al. |
| 6,608,560 B2 | 8/2003 | Abrams |
| 6,624,750 B1 | 9/2003 | Marman et al. |
| 6,813,221 B1 | 11/2004 | Barr |
| 6,988,070 B2 | 1/2006 | Kawasaki et al. |
| 7,042,349 B2 | 5/2006 | Bergman et al. |
| 7,108,194 B1 | 9/2006 | Hankins, II |
| 7,113,090 B1 | 9/2006 | Saylor et al. |
| 7,119,658 B2 | 10/2006 | Stilp |
| 7,139,716 B1 | 11/2006 | Gaziz |
| 7,146,253 B2 | 12/2006 | Hoog et al. |
| 7,162,253 B2 | 1/2007 | Vare et al. |
| 7,183,907 B2 | 2/2007 | Simon et al. |
| 7,184,960 B2 | 2/2007 | Deisher et al. |
| 7,280,643 B2 | 10/2007 | Howard et al. |
| 7,349,758 B2 | 3/2008 | Miro et al. |
| 7,397,363 B2 | 7/2008 | Joao |
| 7,436,292 B2 | 10/2008 | Rourke et al. |
| 7,436,296 B2 | 10/2008 | Rourke et al. |
| 7,451,937 B2 | 11/2008 | Flood et al. |
| 7,454,269 B1 | 11/2008 | Dushane et al. |
| 7,464,035 B2 | 12/2008 | Funk et al. |
| 7,522,063 B2 | 4/2009 | Ehlers |
| 7,634,504 B2 | 12/2009 | Amundson |
| 7,675,402 B2 | 3/2010 | Lee et al. |
| 7,720,683 B1 | 5/2010 | Vermeulen et al. |
| 7,747,446 B2 | 6/2010 | Blass et al. |
| 7,752,047 B2 | 7/2010 | Morris |
| 7,890,334 B2 | 2/2011 | Park et al. |
| 7,899,912 B2 | 3/2011 | Bisdikian et al. |
| 7,957,974 B2 | 6/2011 | Cho et al. |
| 8,013,730 B2 | 9/2011 | Oh et al. |
| 8,019,567 B2 | 9/2011 | Steinberg et al. |
| 8,042,048 B2 | 10/2011 | Wilson et al. |
| 8,068,881 B2 | 11/2011 | Schrager |
| 8,078,472 B2 | 12/2011 | Resch et al. |
| 8,099,289 B2 | 1/2012 | Mozer et al. |
| 8,107,989 B2 | 1/2012 | Budampati et al. |
| 8,155,767 B2 | 4/2012 | ElMankabady et al. |
| 8,175,884 B1 | 5/2012 | Morris |
| 8,234,119 B2 | 7/2012 | Dhawan et al. |
| 8,239,922 B2 | 8/2012 | Sullivan et al. |
| 8,340,975 B1 | 12/2012 | Rosenberger |
| 8,350,666 B2 | 1/2013 | Kore |
| 8,411,590 B2 | 4/2013 | Wang |
| 8,509,954 B2 | 8/2013 | Imes et al. |
| 8,630,742 B1 | 1/2014 | Stefanski et al. |
| 8,699,944 B2 | 4/2014 | Malamud et al. |
| 8,918,219 B2 | 12/2014 | Sloo et al. |
| 8,976,937 B2 | 3/2015 | Shapiro et al. |
| 9,043,210 B1 | 5/2015 | Adcock et al. |
| 9,240,182 B2 | 1/2016 | Lee et al. |
| 9,354,310 B2 | 5/2016 | Visser et al. |
| 10,030,878 B2 | 7/2018 | Nemcek et al. |
| 10,145,579 B2 | 12/2018 | Stoner et al. |
| 2002/0034956 A1 | 3/2002 | Mekuria |
| 2002/0123896 A1 | 9/2002 | Diez et al. |
| 2002/0193989 A1 | 12/2002 | Geilhufe et al. |
| 2003/0034898 A1 | 2/2003 | Shamoon et al. |
| 2003/0036909 A1 | 2/2003 | Kato |
| 2003/0088642 A1 | 5/2003 | Price et al. |
| 2003/0117486 A1* | 6/2003 | Ferren .................... H04N 7/147 348/E7.083 |
| 2003/0118200 A1 | 6/2003 | Beaucoup et al. |
| 2003/0177012 A1 | 9/2003 | Drennan |
| 2003/0233432 A1 | 12/2003 | Davis et al. |
| 2004/0019489 A1 | 1/2004 | Funk et al. |
| 2004/0215750 A1 | 10/2004 | Stilp |
| 2005/0002535 A1 | 1/2005 | Liu et al. |
| 2006/0161270 A1 | 7/2006 | Luskin et al. |
| 2006/0180676 A1 | 8/2006 | Park et al. |

(56) References Cited

U.S. PATENT DOCUMENTS

| | | |
|---|---|---|
| 2006/0282649 A1 | 12/2006 | Malamud et al. |
| 2007/0012793 A1 | 1/2007 | Flood et al. |
| 2007/0135969 A1 | 6/2007 | Curl |
| 2007/0192486 A1 | 8/2007 | Wilson et al. |
| 2007/0204228 A1 | 8/2007 | Minear |
| 2007/0247301 A1 | 10/2007 | Browne |
| 2007/0263600 A1 | 11/2007 | Sutardja et al. |
| 2007/0286181 A1 | 12/2007 | Bushmitch et al. |
| 2008/0037727 A1 | 2/2008 | Sivertsen et al. |
| 2008/0072314 A1 | 3/2008 | Frenette |
| 2008/0091432 A1 | 4/2008 | Dalton et al. |
| 2008/0150679 A1 | 6/2008 | Bloomfield |
| 2008/0175261 A1 | 7/2008 | Wang |
| 2008/0221714 A1 | 9/2008 | Schoettle |
| 2008/0233983 A1 | 9/2008 | Park et al. |
| 2009/0059786 A1 | 3/2009 | Budampati |
| 2009/0064295 A1 | 3/2009 | Budampati |
| 2009/0086940 A1 | 4/2009 | Diethorn et al. |
| 2009/0134993 A1 | 5/2009 | Ashworth |
| 2009/0143918 A1 | 6/2009 | Amundson et al. |
| 2009/0204262 A1 | 8/2009 | Nishimura |
| 2009/0204410 A1 | 8/2009 | Mozer et al. |
| 2009/0323904 A1 | 12/2009 | Shapiro et al. |
| 2010/0223055 A1 | 9/2010 | Mclean |
| 2010/0332235 A1 | 12/2010 | David |
| 2011/0046792 A1 | 2/2011 | Imes et al. |
| 2011/0140914 A1 | 6/2011 | Pelech et al. |
| 2011/0210816 A1 | 9/2011 | Wang |
| 2011/0257973 A1 | 10/2011 | Chutorash et al. |
| 2011/0260832 A1 | 10/2011 | Ross et al. |
| 2011/0290893 A1 | 12/2011 | Steinberg |
| 2012/0021684 A1 | 1/2012 | Schultz et al. |
| 2012/0062729 A1 | 3/2012 | Hart et al. |
| 2012/0065973 A1 | 3/2012 | Cho et al. |
| 2012/0066286 A1 | 3/2012 | Heredia et al. |
| 2012/0116748 A1 | 5/2012 | Kore et al. |
| 2012/0123561 A1 | 5/2012 | Park et al. |
| 2012/0136666 A1 | 5/2012 | Corpier et al. |
| 2012/0158161 A1 | 6/2012 | Cohn et al. |
| 2012/0327115 A1 | 12/2012 | Chhetri et al. |
| 2013/0006400 A1 | 1/2013 | Caceres et al. |
| 2013/0035774 A1 | 2/2013 | Warren et al. |
| 2013/0077797 A1 | 3/2013 | Hoy et al. |
| 2013/0117395 A1 | 5/2013 | Bushmitch et al. |
| 2013/0138250 A1 | 5/2013 | Mowery et al. |
| 2013/0183944 A1 | 7/2013 | Mozer et al. |
| 2013/0297078 A1 | 11/2013 | Kolavennu |
| 2014/0098233 A1 | 4/2014 | Martin et al. |
| 2014/0153281 A1 | 6/2014 | Zhao et al. |
| 2014/0153747 A1 | 6/2014 | Contolini et al. |
| 2014/0163751 A1 | 6/2014 | Davis et al. |
| 2014/0195233 A1 | 7/2014 | Bapat |
| 2014/0266687 A1 | 9/2014 | Britton |
| 2014/0278394 A1 | 9/2014 | Bastyr et al. |
| 2014/0330435 A1 | 11/2014 | Stoner et al. |
| 2015/0053779 A1 | 2/2015 | Adamek et al. |
| 2015/0053780 A1 | 2/2015 | Nelson et al. |
| 2015/0053781 A1 | 2/2015 | Nelson et al. |
| 2015/0077553 A1 | 3/2015 | Dawes |
| 2015/0187354 A1 | 7/2015 | Kim |
| 2015/0276254 A1 | 10/2015 | Nemcek et al. |
| 2015/0279134 A1 | 10/2015 | Warren |
| 2015/0324179 A1 | 11/2015 | Nye |
| 2016/0134632 A1 | 5/2016 | Cregg |
| 2016/0134966 A1* | 5/2016 | Fitzgerald ............. G06F 1/3287 381/123 |
| 2016/0249132 A1* | 8/2016 | Oliaei .................... H04R 1/326 |
| 2016/0360526 A1 | 12/2016 | Lehmann et al. |
| 2017/0019362 A1 | 1/2017 | Kim et al. |
| 2018/0176680 A1 | 6/2018 | Knight et al. |
| 2018/0367944 A1 | 12/2018 | Heo et al. |

FOREIGN PATENT DOCUMENTS

| | | |
|---|---|---|
| CN | 202092667 U | 12/2011 |
| CN | 102332204 A | 1/2012 |
| CN | 102436273 A | 5/2012 |
| EP | 1054387 A2 | 11/2000 |
| EP | 1119191 A2 | 7/2001 |
| EP | 1260886 A2 | 11/2002 |
| EP | 1345360 B1 | 7/2006 |
| EP | 1135757 B1 | 11/2006 |
| EP | 1415218 B1 | 2/2011 |
| EP | 2801972 A1 | 11/2014 |
| GB | 2094508 A | 9/1982 |
| JP | 2006208460 A | 8/2006 |
| JP | 2006317573 A | 11/2006 |
| JP | 2010181064 A | 8/2010 |
| JP | 2010236759 A | 10/2010 |
| KR | 201000263563 A | 3/2010 |
| KR | 20110012048 A | 2/2011 |
| KR | 20110045314 A | 5/2011 |
| KR | 20120017492 A | 2/2012 |
| KR | 101151571 B1 | 5/2012 |
| WO | 1993013507 A1 | 7/1993 |
| WO | 1999034339 A2 | 7/1999 |
| WO | 0021053 A1 | 4/2000 |
| WO | 2006033760 A2 | 3/2006 |
| WO | 2006126192 A2 | 11/2006 |
| WO | 2007101164 A2 | 9/2007 |
| WO | 2008018102 A2 | 2/2008 |
| WO | 2009107211 A1 | 9/2009 |
| WO | 2009147927 A1 | 12/2009 |
| WO | 2014004911 A2 | 1/2014 |
| WO | 2015026933 A2 | 2/2015 |

OTHER PUBLICATIONS

Action Talking Products LLC, "Kelvin Installation Manual," V1.5, pp. 1-15, downloaded Jul. 14, 2015.
Storify, "A Thermostat That Speaks to a Consumer's Needs," https://storify.com/plumbingtips969/a-thermostat-that-speaks-to-a-consumer-s-needs, printed Jul. 14, 2015, 3 pgs.
SmartWay Solutions, Inc., "Talking Thermostat Model VT3000, User's Guide," downloaded Jul. 14, 2015, 20 pgs.
Systems Controls & Instruments, LLC, "CEM-24 Series Owner's Manual—Installation and Operating Instructions," Rev 6.4, downloaded Jul. 14, 2015, 32 pgs.
"T2 RERC Rehabilitation Engineering Research Center on Technology Transfer, Accessible Thermostat," downloaded Jun. 6, 2013, 40 pgs.
Brown, et al., "Joint DoD/Industry Study on Opportunities in Integrated Diagnostics," Institute for Defense Analysis, Jan. 1990, 110 pgs.
Carrier Comfort Network, "Carrier Comfort System VVTIII," Aug. 1996, 6 pgs.
Carvalho et al., "Voice Thermostat Remote Control," Proceedings of the IEEE 25th Annual Northeast Bioengineering Conference pp. 59-60, Apr. 8-9, 1999.
Coleman, "Hints for Homeowner's, A Thermostat That Speaks to Consumer's Needs," on or before Jul. 20, 2006, 1 pg.
Honeywell, "PM7006A Network Compatible Computer Room Air Conditioning (CRAC) Program Module for W7600 Control Module," Aug. 1993, 72 pgs.
"Kelvin Voice Operated Thermostat," http://www.accendaproducts.com/kelvin/index.html, printed Dec. 9, 2013, 2 pgs.
"Control Your Home by Voice or the Web, Anytime Anywhere," http://www.automatedliving.com, printed Dec. 9, 2013, 1 pg.
"VoiceIR Environmental Voice Controller Configurator—Broadened Horizons," http://www.broadenedhorizons.com/voiceir/, Dec. 9, 2013, 17 pgs.
Voice Recognition & Voice Interactive Products, "http://www.innotechsystems.com/voice.htm," printed Dec. 9, 2013, 1 pg.
Telephone Controlled Thermostat, "http://www.rciautomation.com/thermostat_phone.htm," printed Dec. 9, 2013, 4 pgs.
http://www.talkingthermostats.com/blind.shtml, printed Dec. 12, 2013, 3 pgs.

(56) References Cited

OTHER PUBLICATIONS

"Siri Proxy-NestLearning Thermostat," https://github.com/chilitechno/SiriProxy-NestLearningthermostat, printed Jan. 6, 2014, 3 pgs.
Jacobson, "Design: A Voice Activated Thermostat," Biomedical Sciences Instrumentation, Technical Papers Composing the Proceedings of the 29th Annual Rocky Mountain Bioengineering Symposium & 29th International ISA Biomedical Sciences Instrumentation Symposium, vol. 28, 1992, pp. 15-19.
Lacquet et al., "Short Communications, An Affordable Digital-Display-to-Natural-Voice Converter for Visually Impaired Radio Amateurs," IEEE Transactions on Rehabilitation Engineering, vol. 4, No. No. 4, Dec. 1996, 6 pgs.
Lee et al., "Fault Detection in an Air-Handling Unit Using Residual and Recursive Parameter Identification Methods," ASHRAE Transactions vol. 102, Pt. 1, pp. 1-22, 1996.
Lopez et al., "Temperature and Humidity Laboratory Remote Controller," Journal of the Mexican Society of Instrumentation, pp. 14-20, 1996.
Miles et al., "An Audible Thermostat for the Blind or Visually Challenged," Proceedings of the IEEE 23rd Northeast Bioengineering Conference, pp. 68-69, May 21-22, 1997.
Piette et al., "Model-Based Chiller Energy Tracking for Performance Assurance at a University Building," Cool Sense National Forum on Integrated Chiller Retrofits, San Francisco, Calif, LBNL Report-40781, Sep. 1997 17 pgs.
"Comfort Solutions for Persons Who are Blind or have Low Vision, VIP 3000 Residential Talking Thermostat that Promotes Independent Living," Talkingthermostats.com, 2003, 2 pgs.
Venstar, "Comfort Call System ACCO433 Owner's Manual," Aug. 2007, 24 pgs.
Walters, "Siri Hack Allows Voice Control of Home Thermostat," found at http://www.extremetech.com/computing/106073-sir-hack-allows-voice-control-of-home..., Nov. 21, 2011, 2 pgs.
Watt, "Development of Empirical Temperature and Humidity-Based Degraded-Condition Indicators for Low-Tonnage Air-Conditioners," Thesis, Dec. 1997, 205 pgs.
Watt, "Predictive Maintenance Programs (PMP's) in Small HVAC Applications: Analysis of Available Products and Technology," ESL Report from Paper Prepared for MEEN 662, Apr. 1994, 4 pgs.
"Stargate Interactive Automation System: JDS Technologies," Web.archive.org/web20030215020919/http:www.idstechnologies.com/stargate.html, printed May 9, 2013, 9 pgs.
Nusca, Andrew: "How Apple's Siri really works," https://zdnet.com/article/how-apples-siri-really-works/, Nov. 3, 2011, 4 pgs.
Lennox "icomfort Thermostat Manual," Sep. 2012 edition Retrieved from the internet Jun. 14, 2017 URL:http://airmastersheating.com/Lennox_icomfortWiFi_Manual.pdf, 21 pgs.
2 gig Technologies, "Go Control Wireless Security System, Installation & Programming Instructions," 2010, 52 pgs.
Extended European Search Report for European Patent Application 18189290.2, dated Nov. 13, 2018, 6 pgs.

\* cited by examiner

SYSTEMS AND METHODS FOR AUTOMATIC SPEECH RECOGNITION

FIELD

The present invention relates generally to speech recognition systems and methods. More particularly, the present invention relates to systems and methods for activating a direction setting of a multi-directional microphone array in response to a sensor determining a relative location of a user within one of a plurality of voice pickup areas of the multi-directional microphone array.

BACKGROUND

Known speech recognition systems and methods use a multi-directional microphone array operating initially in a directionless setting. The multi-directional microphone array detects a wakeup command from within one of a plurality of voice pickup areas and, in response, activates a direction setting associated with the one of the plurality of voice pickup areas that receives the wakeup command to enhance speech recognition of forthcoming speech coming from the one of the plurality of voice pickup areas. However, such known systems and methods do not activate the direction setting prior to receiving the wakeup command, which results in unintended or missed activation of the multi-directional microphone array caused by interference during operation in the directionless setting.

In view of the above, there is a continuing, ongoing need for improved systems and methods.

DETAILED DESCRIPTION

Figure 1:
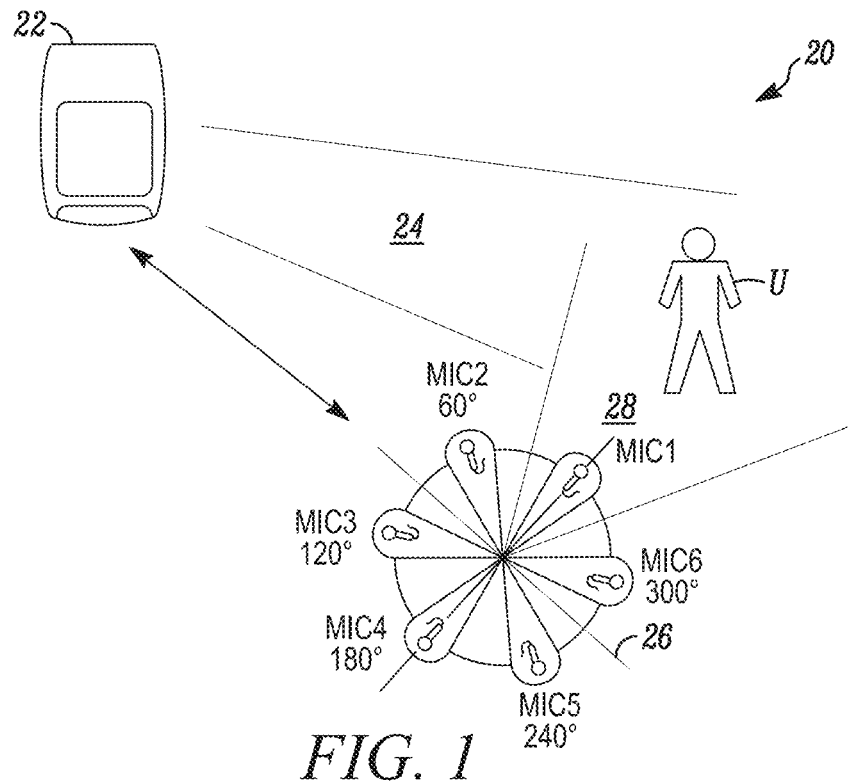
FIG. 1 is a block diagram of a sensor and a multi-directional microphone array in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for automatic speech recognition. For example, systems and methods disclosed herein can include a sensor detecting a relative location of a user within one of a plurality of voice pickup areas of a multi-directional microphone array and the multi-directional microphone array activating a direction setting of the multi-directional microphone array based on the relative location of the user within the one of the plurality of voice pickup areas, wherein the direction setting enhances speech recognition by the multi-directional microphone array from the relative location of the user within the one of the plurality of voice pickup areas.

Systems and methods as disclosed herein may be deployed as standalone devices interacting together or as a part of home automation systems or security systems. It is to be understood that such systems can include, but are not limited to systems that include a control panel in communication with a sensor or a plurality of sensors and a multi-directional microphone array or a plurality of multi-directional microphone arrays deployed in a region In accordance with disclosed embodiments, each of a plurality of sensors may be positioned to detect a respective location of the user within a respective one of the plurality of voice pickup areas of the multi-directional microphone array. Accordingly, the sensor may be positioned to detect the relative location of the user within the one of the plurality of voice pickup areas of the multi-directional microphone array. Each of the plurality of voice pickup areas may detect sound or recognize voice commands from a respective direction surrounding the multi-directional microphone array. Accordingly, as the user enters a field of view or detection area of the sensor, the sensor may detect the relative location of the user that corresponds to the one of the plurality of voice pickup areas. In response to the sensor detecting the relative location of the user, the multi-directional microphone array may activate a direction setting associated with the one of the plurality of voice pickup areas. The direction setting may be used to enhance speech recognition by the multi-directional microphone array in the direction of the one of the plurality of voice pickup areas, thereby enhancing the ability of the multi-directional microphone array to receive wakeup commands from the relative location of the user, which can facilitate avoiding or reducing unintended or missed wakeup commands. In some embodiments, the sensor can include a microwave-based location sensor. However, additional types of sensors known in the art for detecting the relative location of the user may come within the spirit and scope of disclosed embodiments.

In some embodiments, when the direction setting is activated, the multi-directional microphone array may detect the wakeup command from the relative location of the user and, in response, may enter an active listening mode to identify additional commands or speech commands coming from the direction of the relative location of the user. In some embodiments, the direction setting may include directing a beamforming function of the multi-directional microphone array toward the relative location of the user within the one of the plurality of voice pickup areas.

In some embodiments, a control panel or similar control unit may be electrically coupled to the sensor and the multi-directional microphone array. The control panel may transfer data indicative of the relative location of the user between the sensor and the multi-directional microphone array using either wired or wireless communication methods. In some embodiments, the sensor can be paired with the multi-directional microphone array to directly communicate the relative location of the user to the multi-directional microphone array. In some embodiments, communication of the relative location of the user from the sensor to the multi-directional microphone array, either directly or through the control panel, can be accomplished using an Internet-based communication protocol.

In some embodiments, a plurality of sensors and a plurality of multi-directional microphone arrays may be placed throughout the region and coupled to the control panel. Each of the plurality of multi-directional microphone arrays may include a respective plurality of voice pickup areas that operate as described herein. The respective plurality of voice pickup areas may detect sound or recognize voice commands from multiple different directions surrounding a respective one of the plurality of multi-directional microphone arrays.

In some embodiments, as the user enters the field of view or the detection area of one of the plurality of sensors, the one of the plurality of sensors may detect the relative location of the user within the region and forward the relative location to the control panel. In response to the one of the plurality of sensors detecting the relative location of the user, the control panel may identify one of the plurality of multi-directional microphone arrays for which one of the respective plurality of voice pickup areas is closest to or within range of the relative location of the user and may send the relative location to the one of the plurality of multi-directional microphone arrays.

In some embodiments, the one of the plurality of multi-directional microphone arrays may activate a respective direction setting associated with the one of the respective plurality of voice pickup areas. The respective direction setting may be used to enhance speech recognition by the one of the plurality of multi-directional microphone arrays in the direction of the one of the respective plurality of voice pickup areas, thereby enhancing the ability of the plurality of multi-directional microphone arrays to receive wakeup commands from the relative location of the user within the region, which can facilitate avoiding or reducing unintended or missed wakeup commands. In some embodiments, the plurality of sensors can include microwave-based location sensors. However, additional types of sensors known in the art for detecting the relative location of the user come within the spirit and scope of disclosed embodiments.

In some embodiments, when the respective direction setting is activated, the one of the plurality of multi-directional microphone arrays may detect wakeup commands from the relative location of the user within the region and, in response, may enter the active listening mode to identify the additional commands or the speech commands from within the one of the respective plurality of voice pickup areas. In some embodiments, the respective direction setting may include directing the beamforming function associated with the one of the respective plurality of voice pickup areas of the one of the plurality of multi-directional microphone arrays toward the relative location of the user within the region.

Figure 2:
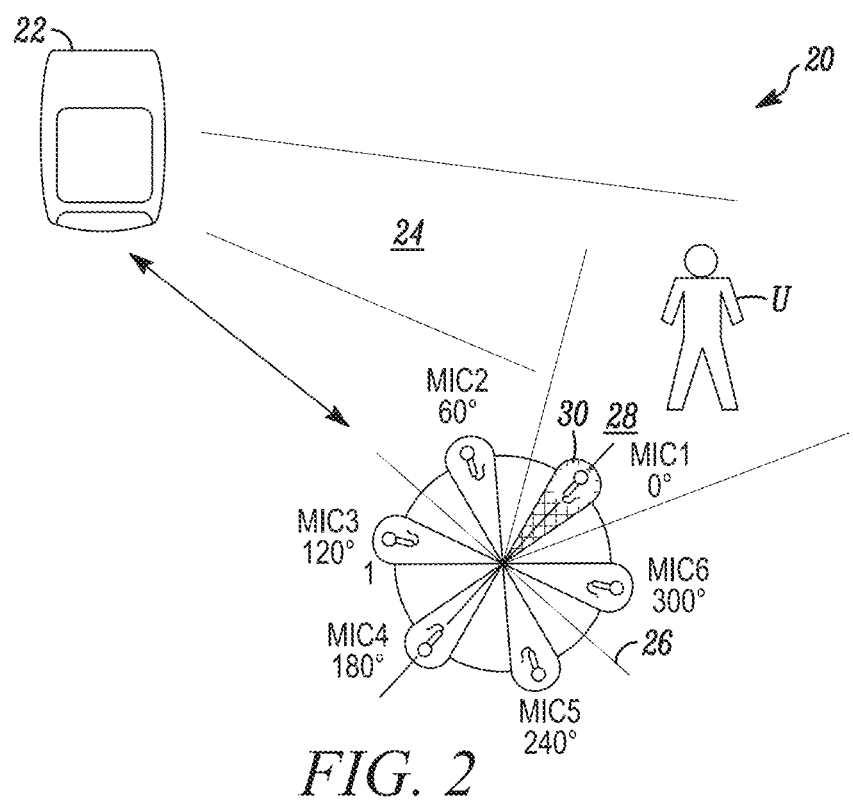
FIG. 2 is a block diagram of a sensor and a multi-directional microphone array in accordance with disclosed embodiments.

FIG. 1 and FIG. 2 are block diagrams of a system 20 for automatic speech recognition in accordance with disclosed embodiments. As shown in FIG. 1, the system 20 can include a sensor 22 (e.g. a microwave sensor, PIR sensor, RF sensor, location sensor, etc.) and a multi-directional microphone array 26. The sensor 22 can detect when a relative location of a user U is within a detection area 24 of the sensor 22 corresponding to a specific voice pickup area 28 of the multi-directional microphone array 26 and can communicate the relative location of the user U to the multi-directional microphone array 26. In some embodiments, the specific voice pickup area 28 can be one of a plurality of voice pickup areas of the multi-directional microphone array 26.

As shown in FIG. 2, the multi-directional microphone array 26 can activate a direction setting 30 in response to receiving the relative location of the user U from the sensor 22. The direction setting may correspond to the specific voice pickup area 28 that is associated with the relative location of the user U. In some embodiments, the direction setting can activate a beamforming function of the multi-directional microphone array directed toward the relative location of the user U.

Figure 3:
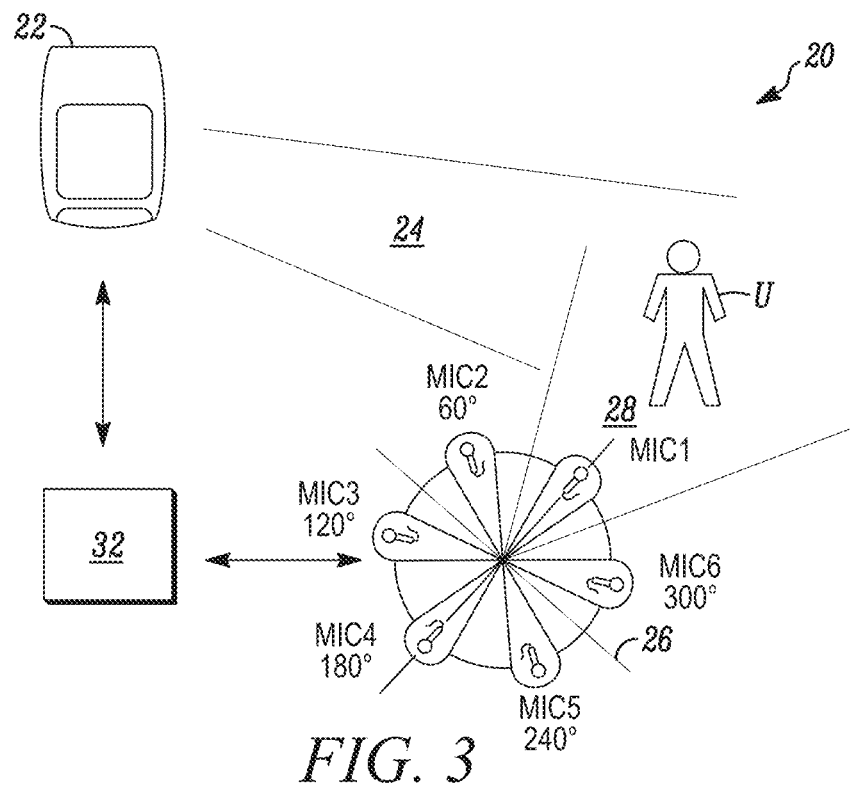
FIG. 3 is a block diagram of a sensor, a multi-directional microphone array, and a control panel in accordance with disclosed embodiments.
Figure 4:
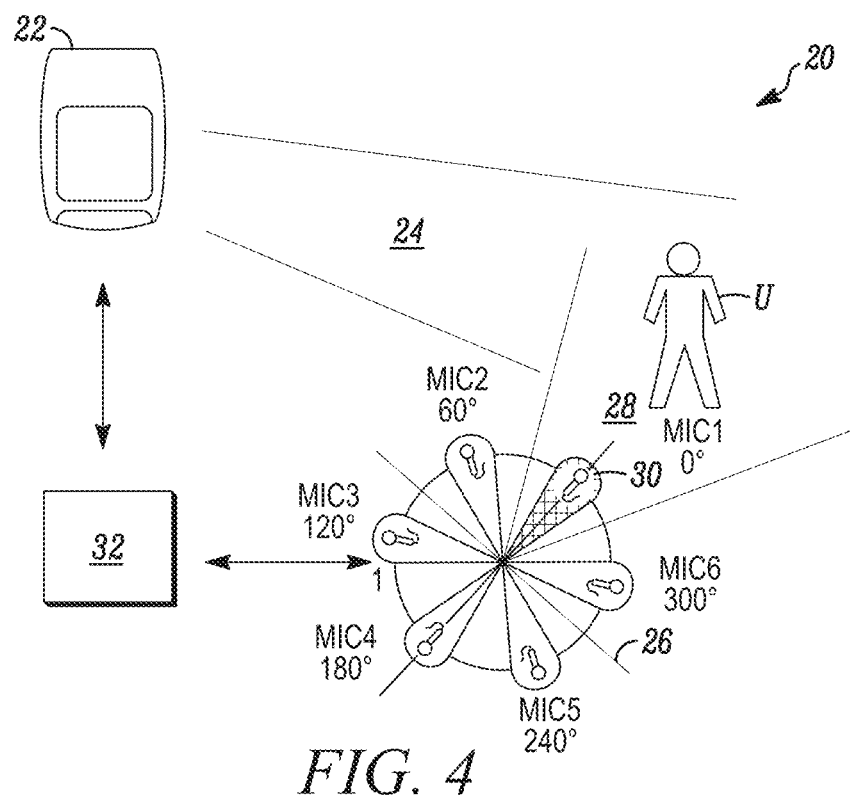
FIG. 4 is a block diagram of a sensor, a multi-directional microphone array, and a control panel in accordance with disclosed embodiments.

In some embodiments, as shown in FIG. 3 and FIG. 4, the system 20 for automatic speech recognition can include a control panel 32 that can communicate with the sensor 22 and the multi-directional microphone array 26. The control panel 32 can receive first data indicative of the relative location of the user U from the sensor 22 and send second data indicative of the relative location of the user U to the multi-directional microphone array 26.

Figure 5:
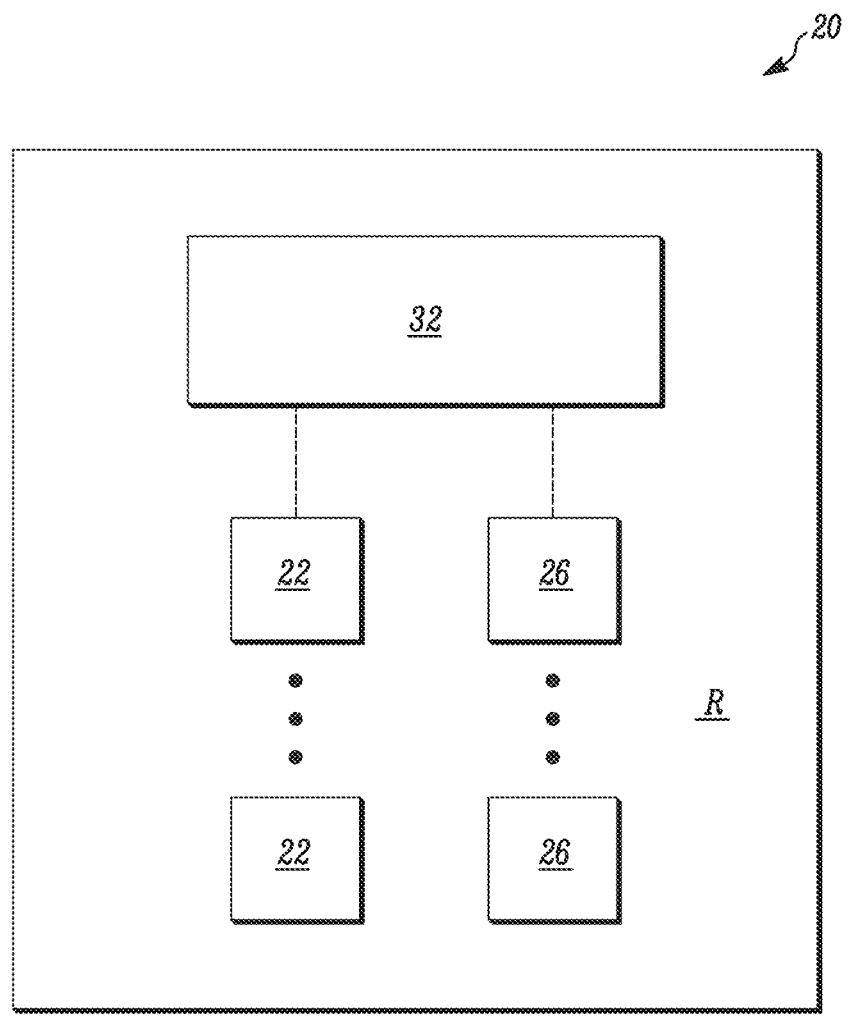
FIG. 5 is a block diagram of a plurality of sensors, a plurality of multi-directional microphone arrays, and a control panel deployed in a region in accordance with disclosed embodiments.

In some embodiments, as shown in FIG. 5, the system 20 for automatic speech recognition can include a plurality of sensors 22 and a plurality of multi-directional microphone arrays 26 deployed in a region R each of which can communicate with the control panel 32. As the user U enters a field of view detection area of one of the plurality of sensors 22, the one of the plurality of sensors 22 may detect the relative location of the user U within the region R and forward the relative location to the control panel 32. In response to the one of the plurality of sensors 22 detecting the relative location of the user U, the control panel 32 may identify one of the plurality of multi-directional microphone arrays 26 for which one of a respective plurality of voice pickup areas is proximate to the relative location of the user U and may send the relative location to the one of the plurality of multi-directional microphone arrays. Upon receiving the relative location of the user U from the control panel 32, the one of the plurality of multi-directional microphone arrays may operate to activate a direction setting as described herein.

Although a few embodiments have been described in detail above, other modifications are possible. For example, the steps described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A security or home automation system comprising:
a multi-directional microphone array that includes a plurality of microphones each of which corresponds to a respective one of a plurality of voice pickup areas; and
control circuitry in communication with the multi-directional microphone array,
wherein the control circuitry is configured to receive information identifying a location of a user relative to the multi-directional microphone array,
wherein, after receiving information identifying the location of the user relative to the multi-directional microphone array, the control circuitry is configured to transmit instructions to the multi-directional microphone array to enter a first microphone setting, wherein the first microphone setting comprises activation of a first microphone of the plurality of microphones, wherein, after entering the first microphone setting, the first microphone is configured to detect a wakeup command at the multi-directional microphone array, and wherein, responsive to detecting the wakeup command at the first microphone and while in the first microphone setting, the multi-directional microphone array is configured to enter an active listening mode at the multi-directional microphone array.

2. The security or home automation system of claim 1, wherein the control circuitry is configured to receive a first signal from a first sensor in or proximate to a first area of the plurality of voice pickup areas.

3. The security or home automation system of claim 2, wherein the first signal comprises the information identifying the location of the user relative to the multi-directional microphone array.

4. The security or home automation system of claim 3, wherein the first signal is indicative of the first sensor detecting the user in the first area of the plurality of voice pickup areas.

5. The security or home automation system of claim 1, wherein each of the plurality of microphones is capable of detecting sound from a respective one of a plurality of directions surrounding the multi-directional microphone array.

6. The security or home automation system of claim 1, wherein the wakeup command includes a voice command of the user.

7. The security or home automation system of claim 1, wherein, responsive to detecting the wakeup command at the multi-directional microphone array and while in the first microphone setting, the multi-directional microphone array directs a beamforming function of a first microphone of the plurality of microphones towards a first area of the plurality of voice pickup areas.

8. The security or home automation system of claim 1, wherein the control circuitry uses the information identifying the location of the user relative to the multi-directional microphone array to configure the first microphone setting.

9. The security or home automation system of claim 8, wherein the first microphone setting includes activation of a first microphone of the plurality of microphones corresponding to a first voice pickup area of the plurality of voice pickup areas.

10. A method comprising:
associating each of a plurality of microphones of a multi-directional microphone array with a respective one of a plurality of voice pickup areas;
communicating with the multi-directional microphone array via control circuitry that receives information identifying a location of a user relative to the multi-directional microphone array;
after receiving information identifying the location of the user relative to the multi-directional microphone array, transmitting, via the control circuitry, instructions to the multi-directional microphone array to enter a first microphone setting, wherein entering the first microphone setting comprises activating a first microphone of the plurality of microphones;
after entering the first microphone setting, detecting, via the first microphone, a wakeup command at the multi-directional microphone array; and
responsive to detecting the wakeup command at the first microphone and while in the first microphone setting, entering an active listening mode at the multi-directional microphone array.

11. The method of claim 10, further comprising:
receiving a first signal from a first sensor in or proximate to a first of the plurality of voice pickup areas.

12. The method of claim 11, wherein the first signal comprises the information identifying the location of the user relative to the multi-directional microphone array.

13. The method of claim 12, wherein the first signal is indicative of the first sensor detecting the user in the first of the plurality of voice pickup areas.

14. The method of claim 10, wherein each of the plurality of microphones is capable of detecting sound from a respective one of a plurality of directions surrounding the multi-directional microphone array.

15. The method of claim 10, wherein the wakeup command includes a voice command of the user.

16. The method of claim 10, wherein, responsive to detecting the wakeup command at the multi-directional microphone array and while in the first microphone setting, directing, via the multi-directional microphone array, a beamforming function of a first microphone of the plurality of microphones towards a first area of the plurality of voice pickup areas.

17. The method of claim 10, wherein the information identifying the location of the user relative to the multi-directional microphone array is used to configure the first microphone setting.

18. The method of claim 17, wherein the first microphone setting includes activation of a first microphone of the plurality of microphones corresponding to a first voice pickup area of the plurality of voice pickup areas.

* * * * *